United States Patent [19]

Andrieu et al.

[11] Patent Number: 5,604,418
[45] Date of Patent: Feb. 18, 1997

[54] METHOD OF CHARGING A LITHIUM STORAGE CELL HAVING A CARBONE ANODE

[75] Inventors: Xavier Andrieu, Bretigny sur Orge; Philippe Poignant, Issy Les Moulineaux; Antoine Sonnet, Bourg la Reine, all of France

[73] Assignee: Alcatel Alsthom Compagnie Generale D'Electricite, Paris Cedex, France

[21] Appl. No.: 606,297

[22] Filed: Feb. 23, 1996

[30] Foreign Application Priority Data

Feb. 27, 1995 [FR] France .................. 95 02251

[51] Int. Cl.⁶ ............................................. H01M 10/44
[52] U.S. Cl. ........................... 320/21; 320/27; 320/39
[58] Field of Search .................... 320/2, 20, 21, 320/27, 39, 48; 324/430

[56] References Cited

U.S. PATENT DOCUMENTS

| | | |
|---|---|---|
| 4,667,143 | 5/1987 | Cooper et al. . |
| 4,876,513 | 10/1989 | Brilmyer et al. ............... 320/48 X |
| 5,119,001 | 6/1992 | Lambert ............................... 320/43 |
| 5,148,096 | 9/1992 | Denzinger ........................... 320/32 |
| 5,179,335 | 1/1993 | Nor ....................................... 320/21 |
| 5,408,170 | 4/1995 | Umetsu et al. ...................... 320/39 |

FOREIGN PATENT DOCUMENTS

| | | |
|---|---|---|
| 614473 | 1/1994 | Japan . |
| 2248735 | 4/1992 | United Kingdom . |

*Primary Examiner*—Peter S. Wong
*Assistant Examiner*—Patrick B. Law
*Attorney, Agent, or Firm*—Sughrue, Mion, Zinn, Macpeak & Seas

[57] ABSTRACT

The present invention provides a method of charging a carbon-anode lithium storage cell, which method comprises a first step in which a constant current is imposed and during which the voltage across said storage cell is allowed to increase until it reaches a reference value, and then a second step in which said reference voltage is imposed and said current decreases. The method of the invention is characterized in that, at each instant, said reference voltage is equal to the sum of the end-of-charge voltage of the cell plus the product of the current multiplied by the ohmic resistance of the cell.

4 Claims, 4 Drawing Sheets

METHOD OF CHARGING A LITHIUM STORAGE CELL HAVING A CARBONE ANODE

The present invention relates to a charging method for charging a lithium storage cell having a carbon anode, or to charging a plurality of such storage cells, optionally associated in a battery. The invention extends to apparatus for implementing the method.

Until now, such storage cells having included an anode made of lithium metal in which the dissolving/recrystallization operation with associated formation of dendrites limits the applicable current densities and the lifetime of the storage cell. Recently developed storage cells possess an anode comprising a carbon-containing material in which lithium ions are absorbed and desorbed during charging and then discharging. The cathode of such a storage cell comprises an insertion material, generally a metal oxide (magnesium dioxide, cobalt oxide, nickel oxide, etc. . . . ) to which a conductive material has been added, usually carbon.

The known method of charging comprises two main steps. In a first step, constant current is imposed on the storage cell. The voltage of the storage cell then increases until it reaches a fixed voltage that is the end-of-charge voltage characteristic of the type of storage cell. In practice, the charge factor at the end of the first step is about 50% to 70%.

Subsequently, in a second step, the voltage is maintained at its end-of-first-step value for as long as is required to obtain the desired charge factor which is generally about 75% to 95%. Current falls off until it reaches some very small value.

In some cases, it is necessary to reduce the time required for charging such storage cells, in particular in portable appliances where users call for the option of very rapid charging.

It is not possible to increase the value of the constant current during the first step without degrading charging efficiency: which means that for the same delivered quantity of electricity, the charge factor will be lower at the end of the first step. During the second step, the maximum charge factor that can be reached is limited by the impedance of the storage cell. There is therefore no point in increasing the duration of the second step. Under such conditions, shortening charging time always leads to partial charging.

A solution has been proposed in U.S. Pat. No. 5,204,611, which consists in servo-controlling the end-of-charge voltage to the voltage measured for zero current. That method is complex to implement since it requires memory means and servo-control means to be associated, and in addition it is not applicable to all storage cell technologies, e.g. to spiral-wound storage cells having impedance with a large inductive component.

An object of the present invention is therefore to provide a method of charging such storage cells which is faster than known methods and which leads to a charge factor that is of the same order.

Another object of the invention is to propose a method of charging such storage cells rapidly without any risk of damaging them and reducing their lifetime.

Another object of the invention is to propose a method of charging such storage cells rapidly, which is easy to implement and which can be applied to any technology.

The present invention provides a method of charging a carbon-anode lithium storage cell having as characteristics an end-of-charge voltage and an ohmic resistance, which method comprises a first step in which a constant current is imposed and during which the voltage across said storage cell is allowed to increase until it reaches a reference value, and then a second step in which said reference voltage is imposed and said current decreases, the method being characterized in that, at each instant, said reference voltage is equal to the sum of said end-of-charge voltage plus the product of said current multiplied by said ohmic resistance.

The above-mentioned ohmic resistance is defined as being the value of the real component of the impedance of the storage cell as measured at high frequency. It covers, in particular, the resistances of the current collectors (electron conductors) and of the separators (ion conductors). At low frequency, the internal resistance comprises said ohmic resistance plus diffusion and transfer resistances. For a carbon anode lithium storage cell, the ohmic resistance does not vary. If the ohmic resistance were to vary by some very small amount, then it is the minimum value thereof that should be used as the compensation value.

The method of the invention is used for charging a storage cell having ohmic resistance R and an end-of-charge voltage $U_f$. The first step is performed at constant current $I_c$. The reference voltage $U_r$ determining the end of the first step is set by the following equation:

$$U_r = U_f + (I_c \times R)$$

The second step consists in imposing a reference voltage $U_i$ that causes the current $I_i$ to decrease. At each instant, the voltage $U_i$ varies as a function of the way $I_i$ changes; it is given by calculating:

$$U_i = U_f + (I_i \times R)$$

where i represents the order number of the measurement performed, which number varies over the range 1 to N, N being the total number of measurements.

A single measurement suffices to determine the reference voltage for the first step since current is then constant. The value of said reference voltage is calculated on a permanent basis either by an analog servo-control loop, or else by software.

Thus, by implementing the method of the present invention, it is possible to reduce the total time required for charging by an amount that may be as great as 30% of the time required by the known method, while nevertheless maintaining charge factor at a high value.

The apparatus used for charging a storage cell in application of the method of the invention comprises:

a current-limited voltage supply;

means for memorizing said end-of-charge voltage and said ohmic resistance;

means for measuring said current and said voltage of said storage cell;

calculation means for calculating said reference voltage by summing said end-of-charge voltage and said product of said current multiplied by said ohmic resistance;

comparator means for comparing said measured voltage with said reference voltage; and voltage-imposing means for imposing said reference voltage on said storage cell.

The user specifies the end-of-charge voltage and the ohmic resistance characteristics of the storage cell that is to be charged, and these values are memorized by the apparatus. The current flowing through the charging circuit is measured. The product of the measured current multiplied by the ohmic resistance R of the storage cell is calculated and added to the end-of-charge voltage $U_f$ of the storage cell. The value of the reference voltage $U_i$ is thus obtained for the current under consideration $I_i$ such that:

$$U_r = U_f + (I_t \times R)$$

The real voltage measured across the storage cell is compared with the calculated value for the reference voltage for the constant current that is imposed during the first step. The real voltage of the storage cell increases until it reaches the value of the reference voltage, thus causing charging to stop.

During the second step, the reference voltage is periodically recalculated on the basis of the measured instantaneous current, and the resulting value is imposed on the storage cell.

Other characteristics and advantages of the present invention appear on reading the following description of an embodiment which is naturally given by way of non-limiting illustration, and with reference to the accompanying drawings, in which.

Figure 1:
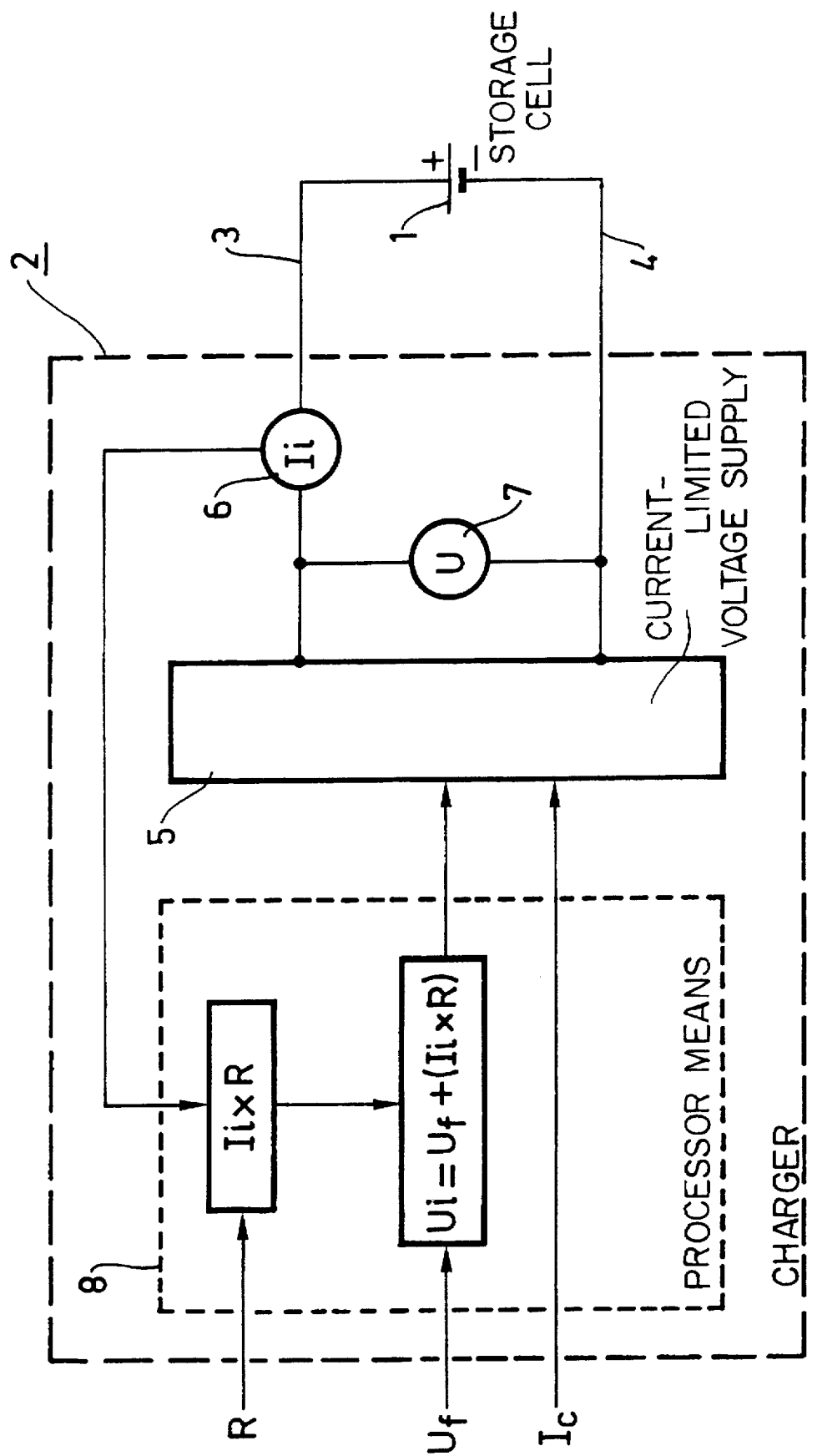
FIG. 1 is a block diagram of charging apparatus for implementing the method of the invention.

FIG. 1 is a diagram of charging apparatus of the invention. The storage cell to be charged 1 is connected to the charging apparatus 2 via two charging cables 3 and 4 respectively connected to the positive and negative terminals of the storage cell 1. The apparatus 2 includes a current-limited voltage supply 5. The measurement means comprise an ammeter 6 for measuring current and a voltmeter 7 for measuring voltage across the terminals of the storage cell. Memory, calculation, and comparator means are combined in a data processing unit 8 which sets the value of the charging current or of the charging voltage in application of values that are determined by calculation.

Figure 2:
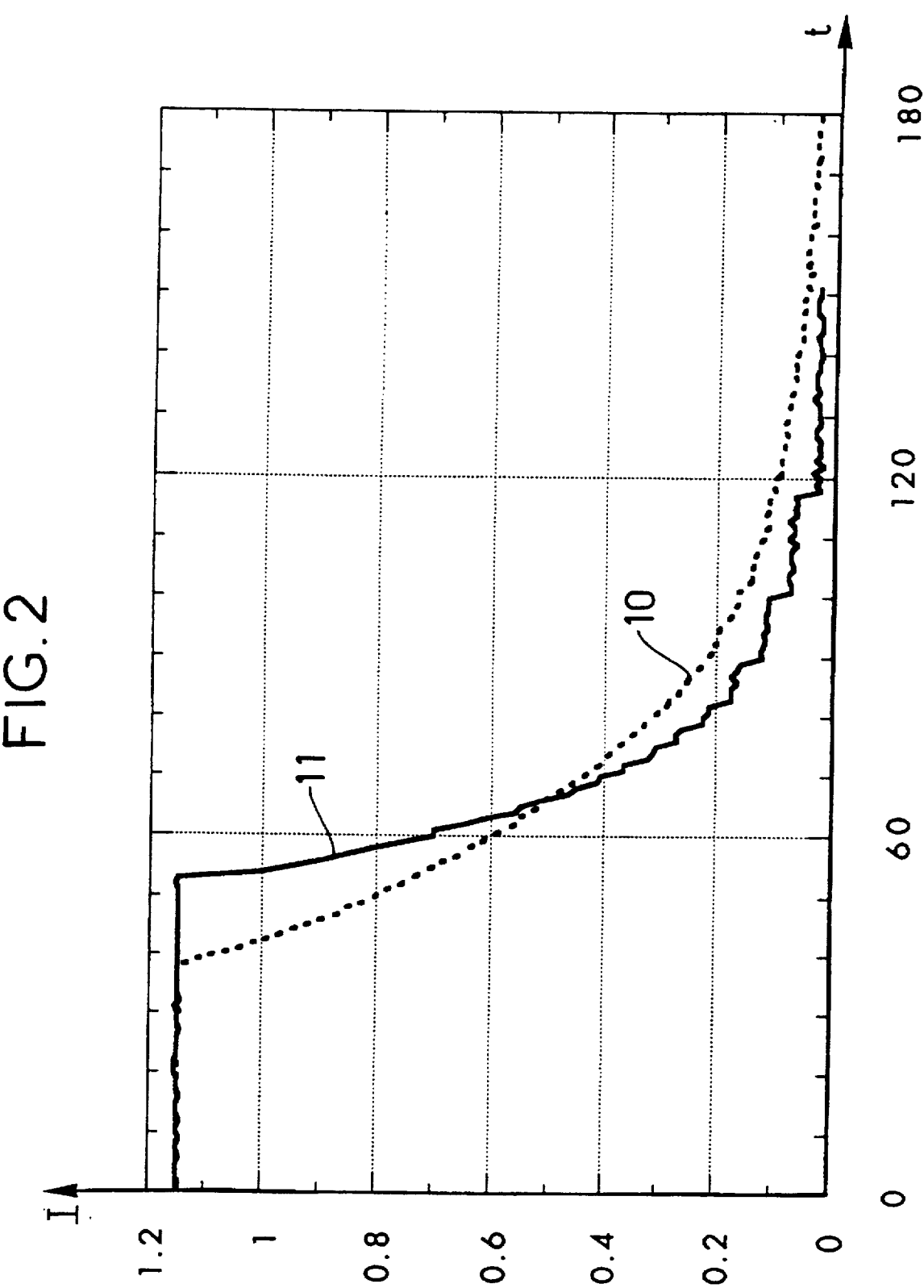
FIG. 2 shows how the current in the circuit varies during charging.
Figure 3:
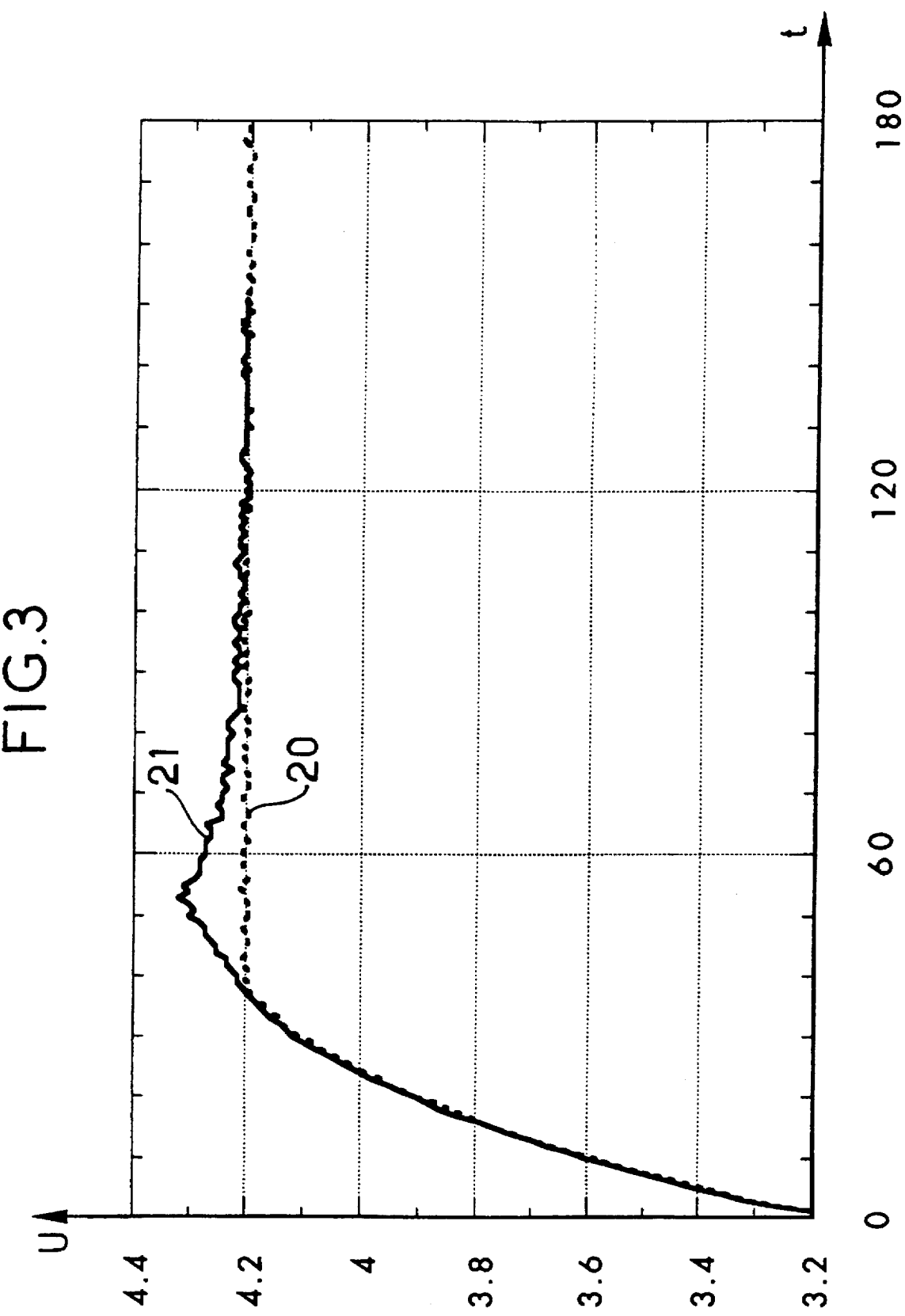
FIG. 3 shows how the voltage of the storage cell varies during charging.

FIG. 2 shows how current I in amps varies as a function of charging time t in minutes, and FIG. 3 shows how the voltage U across a carbon-anode lithium storage cell varies as a function of time t. The cell to be charged has a nominal capacity of 1 Ah, it has an end-of-charge voltage of 4.2 volts, and a series ohmic resistance of 100 milliohms. By way of example, its ohmic resistance may be measured before the beginning of charging using the known method of current interruption.

Charging may be performed by the known method using a first step at a constant current of about 1 A (curve 10). Voltage (curve 20) increases from an initial value of 3.2 V to the end-of-charge voltage value of 4.2 V. The charge factor of the storage cell reaches 60% at the end of the first step. Thereafter, during the second step, the voltage is maintained at a constant value of 4.2 V. Current decreases down to a very low final value. The duration of the second step is about 2 hours. A final charge factor of about 80% is therefore obtained in 3 hours.

Alternatively, using the method of the invention, charging begins as before at a constant current of 1 A (curve 11). Voltage (curve 21) increases until it reaches the end-of-charge voltage value of 4.2 V. However, in the invention the first step then continues up to a reference voltage which has been determined. This reference voltage is calculated by summing the end-of-charge voltage (4.2 V) and the product of the current (1 A) multiplied by the ohmic resistance (0.1 Ω) of the storage cell, i.e. 4.3 V.

During the second step, a reference voltage is imposed which, at each instant, is made equal to the sum of the end-of-charge voltage (4.2 V) plus the product of the instantaneous current multiplied by the ohmic resistance (0.1 Ω). Current then decreases more quickly than in the known method and reaches a very low value. The reference voltage imposed on the storage cell is no longer constant since it varies with current. The duration of the second period is thus considerably reduced, and the final charge factor is still about 80%. Charging is thus achieved in 2.5 hours, giving a time saving of 17%.

Figure 4:
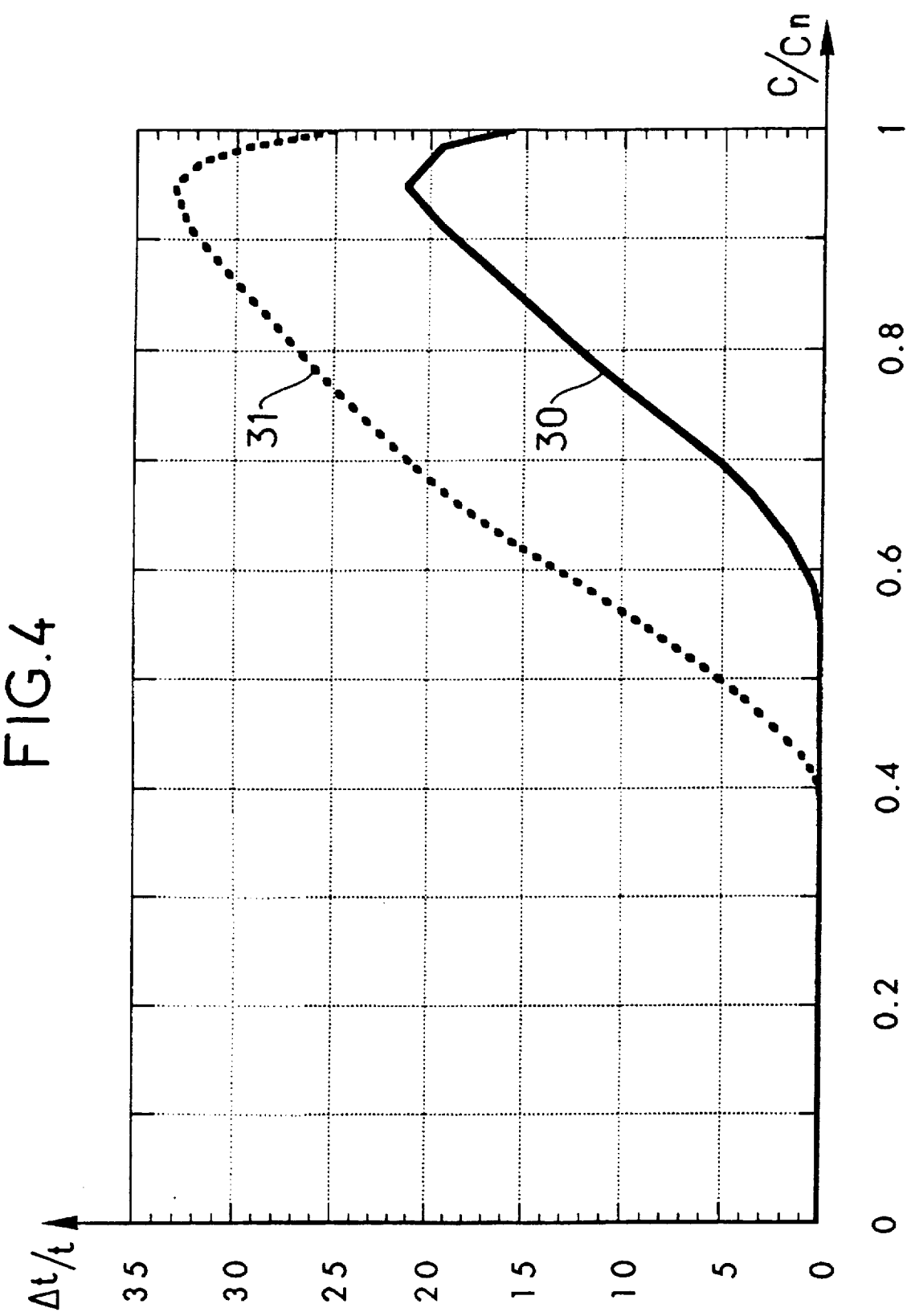
FIG. 4 shows the time saved by the method of the invention compared with the known method, as a function of charge factors reached for two different charging rates.

FIG. 4 shows the ratio $\Delta t/t$ of the charging time reduction $\Delta t$ as obtained by the method of the invention divided by the time t required for charging a storage cell using the known method, as a function of two different charge factors $C/C_n$ (ratio of the capacity C actually charged divided by the theoretical nominal capacity $C_n$ of the storage cell). A storage cell having a capacity of 1 Ah was charged by the method of the invention at a 1 A charging rate (curve 30). The saving obtained increased rapidly for increasing charge factor, and the maximum time saving of 21% was achieved for a charge factor of about 95% of nominal capacity.

Under a faster charging rate at 1.5 A (curve 31) the maximum time saving of 33% was achieved for a charge factor of about 95% of nominal capacity.

Naturally, the present invention is not limited to the embodiment described and shown, and numerous variants can be applied thereto by the person skilled in the art without going beyond the spirit of the invention. In particular, without going beyond the ambit of the invention, it is possible to replace any means by equivalent means.

We claim:

1. A method of charging a carbon-anode lithium storage cell having as characteristics an end-of-charge voltage and an ohmic resistance, which method comprises a first step in which a constant current is imposed and during which the voltage across said storage cell is allowed to increase until it reaches a reference value, and then a second step in which said reference voltage is imposed and said current decreases, the method being characterized in that, at each instant, said reference voltage is equal to the sum of said end-of-charge voltage plus the product of said current multiplied by said ohmic resistance.

2. A charging method according to claim 1, in which said reference voltage is calculated and is readjusted on a continuing basis during said second step.

3. Apparatus for charging by implementing the method according to claim 1, the apparatus comprising:

a supply of voltage and current;

means for memorizing said end-of-charge voltage and said ohmic resistance;

means for measuring said current and said voltage of said storage cell;

calculation means for calculating said reference voltage by summing said end-of-charge voltage and said product of said current multiplied by said ohmic resistance;

comparator means for comparing said measured voltage with said reference voltage; and voltage-imposing means for imposing said reference voltage on said storage cell.

4. Means for charging by the method of claim 3, in which said calculation means, said comparator means, and said voltage imposition means are suitable for calculating and readjusting said reference voltage on a continuing basis during said second step.

* * * * *